US007140087B1

(12) United States Patent
Giltner

(10) Patent No.: US 7,140,087 B1
(45) Date of Patent: Nov. 28, 2006

(54) METHODS FOR EXTRACTING FASTENERS FROM A HOST MATERIAL

(75) Inventor: Jon X. Giltner, Boulder, CO (US)

(73) Assignee: ReConnX, Inc., Boulder, CO (US)

(*) Notice: Subject to any disclaimer, the term of this patent is extended or adjusted under 35 U.S.C. 154(b) by 0 days.

(21) Appl. No.: 11/101,751

(22) Filed: Apr. 8, 2005

Related U.S. Application Data

(62) Division of application No. 10/329,229, filed on Dec. 23, 2002, now Pat. No. 6,877,401, which is a division of application No. 09/947,834, filed on Sep. 6, 2001, now abandoned.

(51) Int. Cl.
*B23P 19/00* (2006.01)
*B23P 19/04* (2006.01)
*B23B 13/50* (2006.01)

(52) U.S. Cl. ................. 29/426.1; 29/426.4; 29/402.08; 81/53.2; 254/18

(58) Field of Classification Search ............... 29/426.4, 29/426.1, 402.08
See application file for complete search history.

(56) References Cited

U.S. PATENT DOCUMENTS

| | | | |
|---|---|---|---|
| 155,429 | A | 9/1874 | Devine |
| 401,113 | A | 4/1889 | Baumeister |
| 410,780 | A | 9/1889 | Cahn |
| 1,516,155 | A | 11/1924 | Santarelli |
| 1,547,944 | A | 7/1925 | Murphree |
| 2,435,137 | A | 1/1948 | Geertsema |
| 2,570,914 | A | 10/1951 | Buck |
| 2,570,915 | A | 10/1951 | Buck |
| 2,709,570 | A | 5/1955 | Henry |
| 2,735,649 | A | 2/1956 | Swallert |
| 2,750,821 | A | 6/1956 | Hilsinger |
| 3,106,233 | A | 10/1963 | Wolny |
| 3,735,650 | A | 5/1973 | Weng, Jr. |
| 3,750,500 | A | 8/1973 | Peterson |
| 3,978,576 | A | 9/1976 | Mustoe, Jr. |
| 3,979,978 | A | 9/1976 | Smolik |
| 4,007,913 | A | 2/1977 | Aldrich |
| 4,078,458 | A | 3/1978 | Berendzen |
| 4,078,766 | A | 3/1978 | Saurwein |
| 4,350,064 | A | 9/1982 | Markle |

(Continued)

FOREIGN PATENT DOCUMENTS

CA 1173716 9/1984

(Continued)

OTHER PUBLICATIONS

Nail Spinner; Vermont American, Product Package, 2001 (see related below).

(Continued)

*Primary Examiner*—David P. Bryant
*Assistant Examiner*—Sarang Afzali
(74) *Attorney, Agent, or Firm*—Harold A. Burdick

(57) ABSTRACT

Apparatus and methods for extraction of nails, screws and other such fasteners from wood or other host materials are disclosed. One embodiment of the apparatus includes a shank adapted for application at a rotational drive source, a two-part engaging member at one end of the shank having a cavity extending thereinto for receiving therein a fastener to be extracted and openable to release the fastener after extraction. A cutting component is defined at a bottom edge of the engaging member adjacent to an opening to the cavity for cleanly removing host material from around the fastener. A gripping surface formation comprising a spiraling striation is formed at a surface of the cavity for threadably engaging the fastener to be removed.

19 Claims, 10 Drawing Sheets

U.S. PATENT DOCUMENTS

| | | | |
|---|---|---|---|
| 4,389,913 | A | 6/1983 | Drouin et al. |
| 4,434,687 | A | 3/1984 | Vickio |
| 4,507,837 | A | 4/1985 | Hinkle |
| 4,637,113 | A | 1/1987 | Cook |
| 4,658,457 | A | 4/1987 | Rokita |
| 4,688,315 | A | 8/1987 | Jannke |
| 4,776,568 | A | 10/1988 | Perel |
| 4,815,707 | A | 3/1989 | Brown |
| 4,997,163 | A | 3/1991 | Henning |
| 5,141,205 | A | 8/1992 | Iwai et al. |
| 5,213,311 | A | 5/1993 | Sabo |
| 5,251,516 | A | 10/1993 | Desaulniers |
| 5,649,791 | A | 7/1997 | Connolly |
| 5,737,981 | A | 4/1998 | Hildebrand |
| 5,984,272 | A | 11/1999 | Crider |
| 6,015,136 | A | 1/2000 | Benudiz |
| 6,105,935 | A | 8/2000 | Wagner |
| 6,267,025 | B1 | 7/2001 | Sand et al. |
| 6,339,976 | B1 | 1/2002 | Jordan |
| 6,755,392 | B1 * | 6/2004 | Phillips ....................... 254/18 |

FOREIGN PATENT DOCUMENTS

| | | |
|---|---|---|
| GB | 2241661 | 9/1991 |

OTHER PUBLICATIONS

Hollow Screw Extractor: 2001 Woodworking Tools & supplies Catalog; p. 31.

* cited by examiner

METHODS FOR EXTRACTING FASTENERS FROM A HOST MATERIAL

RELATED APPLICATION

This application is a Division of U.S. patent application Ser. No. 10/329,229 filed Dec. 23, 2002 by Jon X. Giltner and entitled "Apparatus for Extracting Fasteners From a Host Material", now U.S. Pat. No. 6,877,401 and which application was a Division of U.S. patent application Ser. No. 09/947,834 filed Sep. 6, 2001 by Jon X. Giltner and entitled "Apparatus and Method for Extracting Fasteners From a Host Material", which application is now abandoned.

FIELD OF THE INVENTION

This invention relates to fastener extraction from yieldable host materials such as wood, plastic, soft metals or the like, and, more particularly, relates to screw or nail extracting apparatus and methods utilizing fastener rotation.

BACKGROUND OF THE INVENTION

The demand for wood products is ever increasing. However, both the quantity and quality of new wood resources is decreasing thereby resulting in increased building expenses and decreased building quality. A considerable inventory of otherwise sound lumber, much of it from old growth forests, is disposed of annually because it has been used and thus has fasteners embedded therein. Much, if not most, of this lumber could be profitably reused if only the fasteners embedded in it could be easily and inexpensively removed without undue damage to the lumber product (often occasioned by nail-removing equipment just to get access to the fastener head). Excessive damage to used lumber often makes the product unusable, but at the very least causes the used product to be dropped in grade to a use below its potential had it remained relatively undamaged.

When undertaking nail extraction, it is often the case that its head is broken away (or that it was headless to begin with) and/or is recessed into the wood material. In the case of screws, it is also common for a broken shank to remain embedded in the host material and for grooves in the head for driving the screw to be stripped away. In all such cases, removal of the fastener has been heretofore extremely difficult without excessive damage to the host material (i.e., the wood fiber for example) within a large radius of the fastener's shank.

Many devices have been heretofore suggested and utilized for aiding in the removal of nails and/or screws from wood. Such devices have included simple lever tools such as claws and pries, mechanized pullers having opposed jaws with limited wood cutting capability, as well as impact tools for driving the fastener through the host. Many such tools necessarily result in excessive damage to the host material, and few of the heretofore known devices are effective where the shank of the fastener is headless and/or where the fastener is totally recessed in the host material.

Of the heretofore known devices for removal of fasteners from yieldable materials such as wood, plastic or the like, many are cumbersome and do not lend themselves to rapid and repeated utilization (i.e., are labor intensive). Most are targeted to specific kinds and sizes of fasteners, as well as specific fastener positions and orientations relative to the host material surface. Moreover, many such devices are quite limited in application, often necessitating more than one tool to remove a single fastener.

SUMMARY OF THE INVENTION

This invention provides improved methods for extracting fasteners such as nails or screws from a host material, and particularly from lumber products to allow profitable reuse thereof. The invention is adapted for extraction of embedded fasteners easily, inexpensively and without undue damage to the host material, and is effective even where the shank of the fastener is headless, stripped and/or totally recessed in the host material. The apparatus utilized in performance of the methods is compact, lends itself to rapid and repeated utilization thereby saving labor, and is not dependent upon type, size (within given ranges to which a particular apparatus is adapted), position or orientation of the fastener. In use, the apparatus generally is the only tool needed for extraction of the fastener.

The apparatus is rotatable, for example utilizing a drill motor or other means of applying torque, and includes a shank adapted for application with a source of rotational motion. An engaging member is utilized and is located at one end of the shank and has a cavity extending thereinto from an opening opposite the member from the shank. A cutting component is defined at the opening for cleanly removing host material around the fastener, and a gripping surface formation is defined in the cavity for establishing an engagement with the fastener. The cavity is preferably a conical formation and the gripping surface formation is preferably a spiraling striation formed in a surface of the cavity for threadably engaging the fastener.

In one embodiment, the engaging member includes a main body and a hinged portion selectively movable relative to the main body. The main body and the hinged portion are each configured so that a cooperative part of the cavity, the cutting component and the gripping surface formation are located thereat. A retaining sleeve around the main body and the hinged portion is movable linearly relative thereto to selectively restrain movement of the hinged portion.

In another embodiment the engaging member is a chuck having a central hub and a perimeter nut with jaw elements positioned between the hub and the nut. The jaw elements together define the cavity and the opening, and each includes cutting component and gripping surface structure.

The method for extracting either nails or screws from a yieldable host material includes the steps of rotating a member to cut away host material around the nail or screw while utilizing rotation of the rotating member to establish an engagement at the member with an end of the nail or screw. The engagement is utilized to rotate the nail or screw to facilitate its removal from the host material.

Utilizing this invention, fasteners that project above, are flush with, or recessed below a wood surface may be accessed, gripped, and removed. During fastener removal, a cylindrical bore is created in the host material to a depth that varies with the depth and size of the fastener and with a diameter selected to allow the bore to be easily filled (with a wood dowel of standard diameter for example). If the fastener's head is missing or small in diameter, this invention allows for access, gripping, and extraction from either end of the fastener, minimizing damage to the host material.

It is therefore an object of this invention to provide improved methods for extracting fasteners from a host material.

It is another object of this invention to provide methods for extracting fasteners from a host material to facilitate profitable reuse of lumber products by easily and inexpensively allowing removal of fasteners therefrom without undue damage to the lumber product.

It is still another object of this invention to provide methods for extracting fasteners from a host material that avoid excessive damage to the host material, and that are effective where the shank of the fastener is headless, stripped and/or totally recessed in the host material.

It is yet another object of this invention to provide methods for extracting fasteners from a host material that are compactly performed, that lend themselves to rapid and repeated utilization, and that are effective with a wide variety of fasteners independent of location and orientation in the host material.

It is still another object of this invention to provide a method utilizing a rotatable apparatus for extraction of fasteners from a yieldable host material that includes a shank adapted for application with a source of rotational motion, and an engaging member at one end of the shank having a cavity extending thereinto from an opening opposite the member from the shank, a cutting component defined at the opening and a gripping surface formation defined in the cavity.

It is another object of this invention to provide a method utilizing an apparatus for extraction of fasteners from a host material that includes an engaging member having a main body and a hinged portion selectively movable relative to the main body, the main body and the hinged portion each configured to define a cooperative part of a cavity, cutting component and a fastener gripping surface formation in the cavity.

It is still another object of this invention to provide a method utilizing an apparatus for extraction of fasteners from a host material that includes a chuck having a central hub and a perimeter nut with jaw elements positioned between the hub and the nut, the jaw elements together defining a fastener receiving cavity, and each of the jaw elements including host material cutting component and fastener gripping surface formation structures thereat.

It is yet another object of this invention to provide a method utilizing an apparatus mountable at a drill motor for extraction of either of nails and screws from wood, the apparatus including a shank mountable at one end thereof at the drill motor, and an engaging member defined at an opposite end of the shank and having a conical cavity extending thereinto from an opening opposite the member from the shank, a cutting component defined at the opening and a spiraling striation formed in a surface of the cavity.

It is yet another object of this invention to provide a method for extracting either of a nail or screw from a yieldable host material, the method including the steps of rotating a member to cut away host material around the nail or screw, utilizing rotation of the rotating member to establish an engagement at the member with an end of the nail or screw while the host material is being cut away, and utilizing the engagement to rotate the nail or screw to facilitate its removal from the host material.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
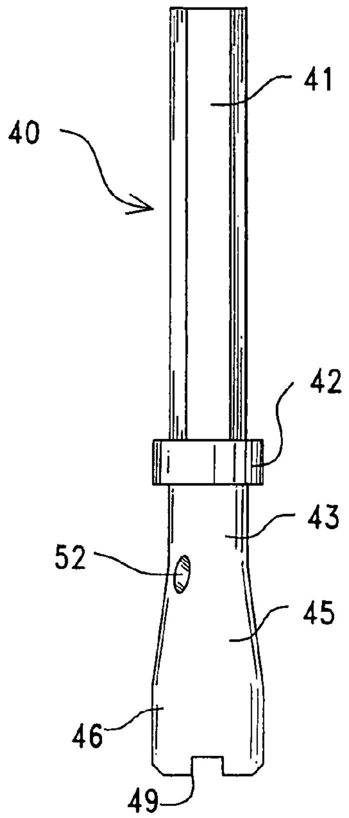
FIG. 1 is a side view of a first embodiment of the apparatus of this invention.
Figure 2:
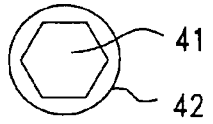
FIG. 2 is a top end view of the apparatus in FIG. 1.

A first embodiment 40 of the apparatus of this invention is illustrated in FIGS. 1 through 4. Apparatus 40 includes shank 41 adapted for application with a selected driver/source imparting rotational motion. Shank 41 is preferably polygonal, but may be cylindrical, and with a cross-section proportioned to fit into the jaws of a standard drill chuck to fix apparatus 40 rotationally and axially. Collar 42 may be provided at shank 41 and above neck 43 so that a pry bar or the like may be positioned adjacent to neck 43 to apply a linear force at bottom surface 44 of collar 42 to lift apparatus 40 as a secondary aid to removal of a fastener where necessary. Collar 42 is preferably a circular shape to provide a flange projecting from neck 43 that is uniformly accessibly from any direction or rotational position of apparatus 40 about its longitudinal axis, as well as to avoid unnecessary interference with adjacent objects.

Fastener engaging member 45 extends from one end of shank 41 at neck 43 and is preferably cylindrical. While the exterior surface of engaging member 45 may be of any configuration, member 45 is preferably tapered from neck 43 with a substantially uniformly expanding diameter to cylindrical lower portion 46. A tapered (i.e., conical) cavity 39 extends into engaging member 45 from opening 47, and has a gripping surface formation 48 at the interior surface thereof. The gripping surface formation is established by transverse striations preferably forming a spiraling internal thread defining gripping teeth utilized to threadably engage a fastener. Lower portion 46, in this embodiment having the largest diameter of member 45, is of a length suitable for providing a stable guide for apparatus 40 as it slidably and rotationally penetrates the host material surface around the fastener for access thereto.

Figure 3:
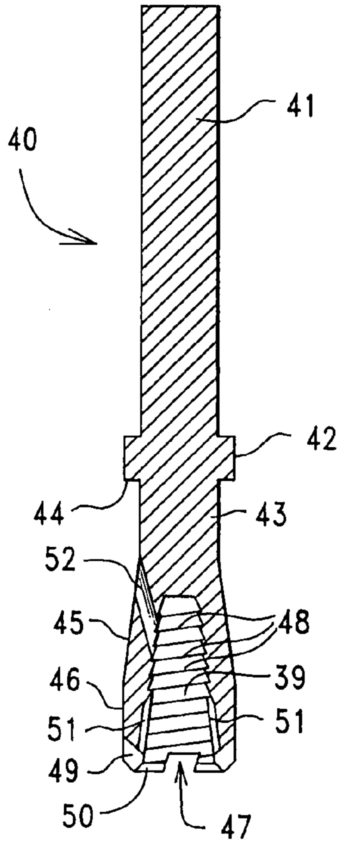
FIG. 3 is a sectional view of the apparatus in FIG. 1.

Conical shaped cavity 39 has a uniformly decreasing radius in proportion to the axial distance from opening 47. This cavity is sized to accept a range of fastener head sizes within its length. The cavity does not need to be conical to be effective, but if not conical, is more limited in the range of fastener sizes it can remove. Spirally threaded surface formation 48 at the inner surface wall of cavity 39 is preferably cut to provide upper edges of the threads that are horizontal (as shown in FIG. 3) to form the gripping teeth. The preferred direction of the spiral threads is counterclockwise to establish engagement with fasteners normally threaded clockwise (where the fastener is a screw; if the fastener is a nail the direction of the threads would not matter).

Figure 4:
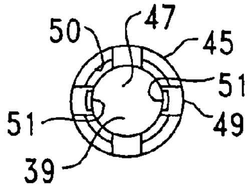
FIG. 4 is a bottom end view of the apparatus in FIG. 1.

As shown in FIGS. 3 and 4, the lower portion of cavity 39 may include slots 51 along the wall of the cavity in plane with the longitudinal axis of apparatus 40. Where provided, slots 51 are relatively sharp edged with the purpose of improving the ability of the internal threaded formation 48 to cut threads into the edges of a fastener to facilitate the required gripping engagement. The bottom edge of cavity 39 (adjacent to opening 47) includes radial flare 50 to enable apparatus 40 to more readily center itself over a fastener. The bottom edge at the outside face of cylindrical lower portion 46 of apparatus 40 is chamfered circumferentially to provide lateral stability of the longitudinal axis of apparatus 40 while in operation. Bottom surface 49 of lower portion 46 of engaging member 45 at opening 47 is structured to provide a cutting component thereat, in this embodiment provided with radially grooved cutting notches, as required to provide an efficient hole cutting means in the host material surrounding the fastener while minimizing displacement of material (e.g., wood fiber) outside the perimeter of the hole. As is apparent from the disclosure herein following, bottom surface cutting component 49 can take any of a number of configurations.

It should be noted that the total cross-sectional and physical properties of apparatus 40 must provide adequate strength and durability to repeatedly perform its intended function. A given tool may be proportioned in size to handle a selected range of fastener diameters (anything from small diameter shanks to the heads of very large circular spikes may be accommodated).

Engaging member 45 of apparatus 40 has cleanout channel 52 extending angularly (on a diagonal axis) from cavity 39 through the outer wall of engaging member 45. Unwanted host material debris captured in the spiraling threads of gripping surface formation 48 at cavity 39 may be dislodged through channel 52 by inserting and forcibly rodding the debris loose with a compatible tool, preferably configured to function without contacting or damaging the internal striations at cavity 39.

Figure 5:
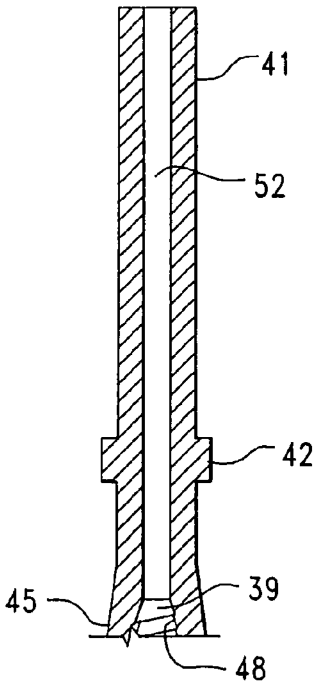
FIG. 5 is a partial sectional view illustrating an alternative cleanout channel arrangement for the apparatus of FIG. 1.

FIG. 5 shows an alternative arrangement of the cleanout channel 52 in apparatus 40. As shown, channel 52 extends from cavity 39 at engaging member 45 through shank 41 to the exterior of the apparatus. This arrangement may improve dynamic balance of apparatus 40 and be easier to manufacture.

FIGS. 6 through 9 illustrate apparatus 40 associated (at shank 41) with driving source 53 and the steps utilized for extracting headed fastener 54 (a nail or screw) embedded in a wood element 55. FIGS. 10 through 13 similarly describe the apparatus's operation in the case of removal of headless fastener 58. In the latter case, the fastener's shank may be gripped at either end (i.e., the driven end or the piercing end).

Driving source 53 may be any externally powered rotating and torsion-delivering device (such as a motor powered drill chuck) which has a means of gripping shank 41, which is capable of being operated counterclockwise and clockwise (preferably at variable speeds), and which has an ability to deliver torque to apparatus 40 as may be required. The torque limit should be set by the user to be well within the user's torque-resisting strength if the driving means is hand-held, and/or within the strength of any equipment not hand-held.

Figure 9:
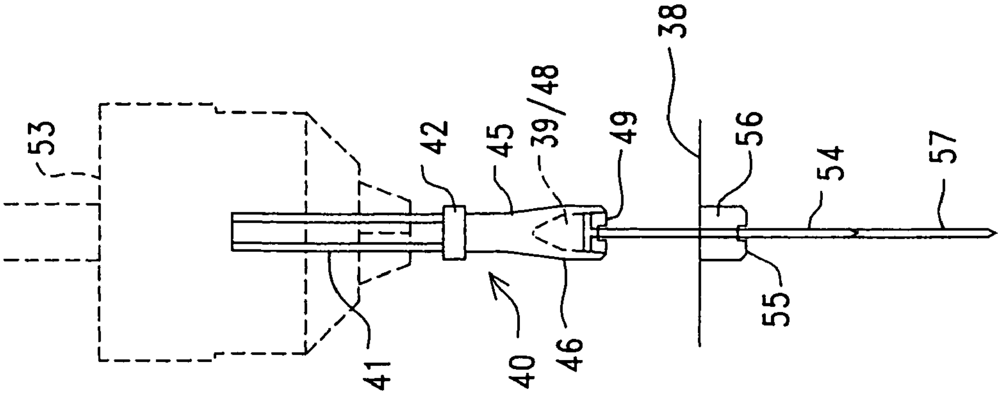
FIGS. 6 through 9 illustrate operation of the apparatus of FIG. 1 for extraction of a headed fastener.
Figure 8:
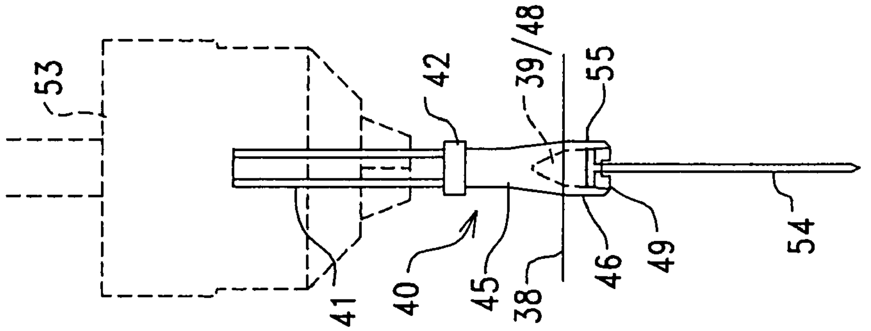
Figure 7:
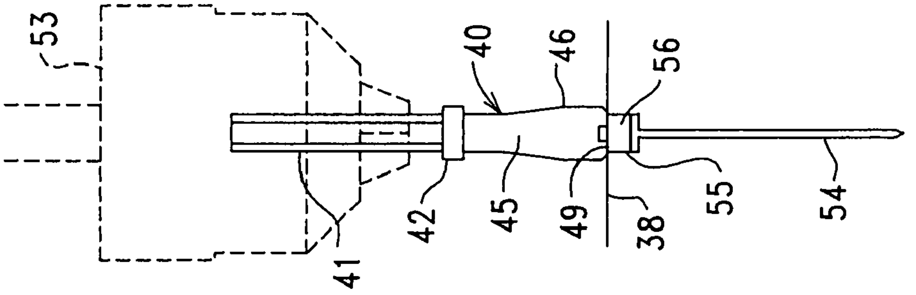
Figure 6:
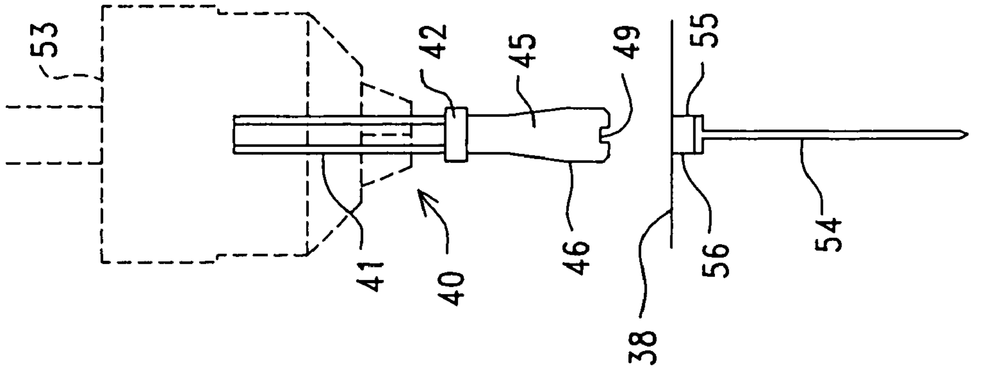
Figure 10:
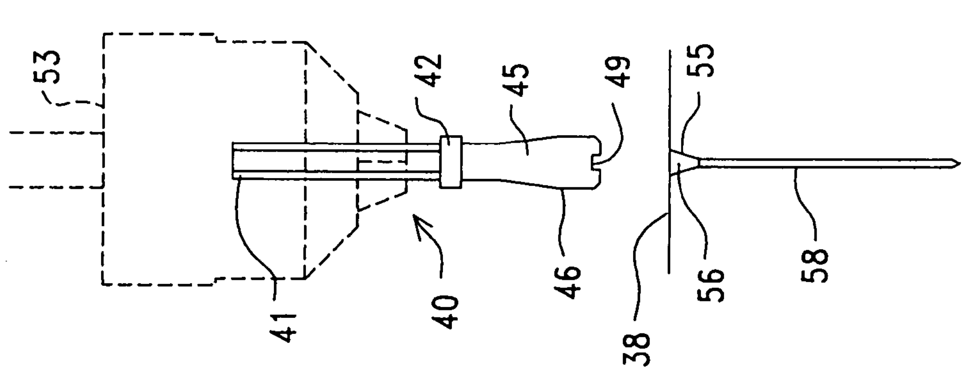
FIGS. 10 through 13 illustrate operation of the apparatus of FIG. 1 for extraction of a headless fastener.
Figure 11:
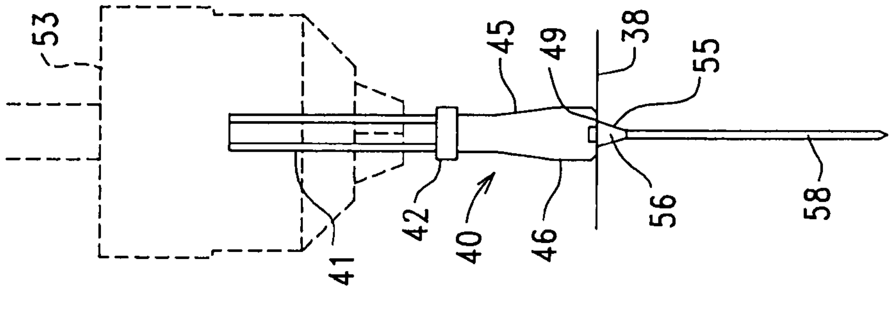
Figure 12:
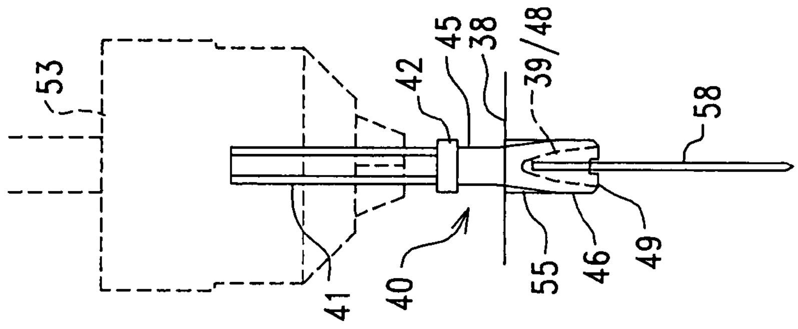
Figure 13:
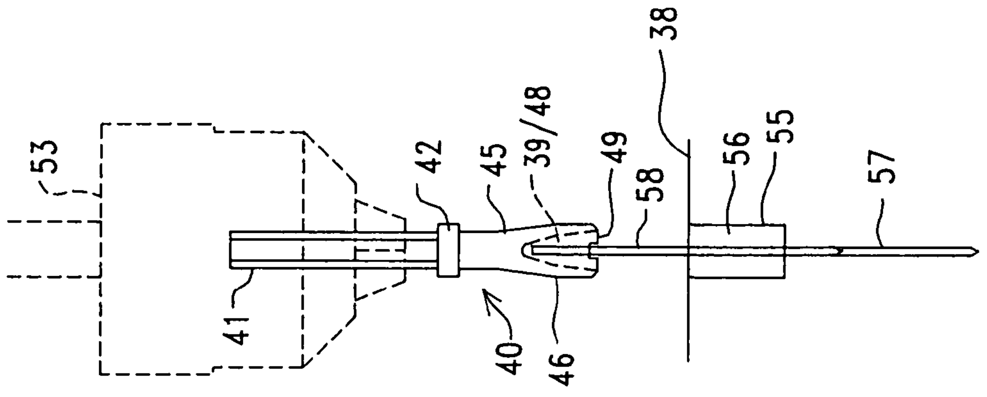

For purposes of illustration, the head of fastener 54 and the end of the shank of fastener 58 are shown recessed (at 56) below the surface 38 of wood element 55. Once apparatus 40 is positioned over fastener 54 (FIGS. 6 and 10) and pressed by the user against wood surface 38 (FIGS. 7 and 11), the chamfer at the outer bottom edge of lower portion 46 of engaging member 45 enables apparatus 40 to remain centered laterally until lower portion 46 is restrained within the confines of the bore created by bottom surface cutting component 49 (FIGS. 8 and 12). FIGS. 9 and 13 show the configuration of the bore (enlarged at 56) as well as fastener shank cavity 57 remaining in the wood after fastener 54 or 58 is removed. The preferred sizing of the perimeter of lower portion 46 is such that the remaining bore may be filled with a standard wood dowel as may be desirable for reusing or rehabilitating the wood element. If a fastener is flush with or raised above the surface of the wood element, a similar sequence applies, with formation of a bore in the wood being either unnecessary or minimal.

In use, apparatus 40 is typically anchored to a standard drill chuck 53 attached to a manually operable drill motor. Apparatus 40 is manufactured in more than one size, each of which is designed to fit a range of sizes of fastener 54/58 heads or shanks. For example, one tool would fit well over the heads of 8*d* through 16*d* nails and heads of similarly sized screws, while another may fit over the heads of 3*d* through 6*d* nails and the heads of similarly sized screws, and so on. In the field, the fastener to be removed may be easily accessible or may be one which is quite remote from surface 38 (accessible only by adding a drill bit extension, for example). In operation, the drill motor is switched on (in its counterclockwise mode of rotation) thereby imparting rotation to engaging member 45 while it is pressed against surface 38 adjacent to and surrounding the fastener position (FIGS. 7, 8, 11 and 12). Rotation is maintained slowly at first to establish a clean, stable cutting position, and member 45 is allowed to drill itself into the wood as may be necessary for the internal gripping surface formation 48 at cavity 39 to threadably establish engagement with the edges of one end of fastener 54/58 (FIGS. 8 and 12).

The rotation of member 45 serves substantially simultaneously to cut away the wood around the fastener cleanly (at cutting component 49) while establishing the engagement with fastener 54 (at the engaging surface formation 48 of cavity 39), regardless of which part of the fastener, head or shank, is first encountered. After initial fastener contact, the teeth defined by the spiraling thread formation 48 at cavity 39 continue to engage the fastener more forcibly with each revolution of apparatus 40 because of the increasing confinement presented by tapered cavity 39. In operation, this desired result is most easily achieved at a low rotational speed of apparatus 40. The fastener will continually be drawn into cavity 39 by the spiraling thread formation 48 until the torque required to further engage fastener 54/58 overcomes the static torsional frictional resistance of the host material/fastener interface. Fastener 54/58 will then begin to rotate with the engagement.

Although frictional resistance is still present, it is smaller in value than the static frictional resistance. Therefore, in the case of a nail, while fastener 54/58 is being rotated it may be pulled (FIGS. 9/13) by the operator with moderate axial force directly out of and away from wood element 55, using only the hand-grip on the drill motor. If additional aid in extraction is required, a pry may be applied at collar 42 as heretofore described.

In the case of a screw, once engagement is thus established at cavity 39, rotational direction of the drill motor allows the screw or screw portion to unthread itself from engagement at the wood element. As may be appreciated, it is not necessary to know ahead of time if the fastener is a nail or screw (perhaps because only the tip of a fastener shank is visible) since counterclockwise rotation of apparatus 40 will remove the fastener in either case.

The fastener may thereafter be removed from apparatus 40 by rotationally restraining apparatus 40 and rotating fastener 54/58 clockwise about its longitudinal axis enough to dislodge it from threaded formation 48 of cavity 39, or by restraining the fastener about its longitudinal axis while operating the drill motor in the clockwise direction achieving the same result.

Figure 14:
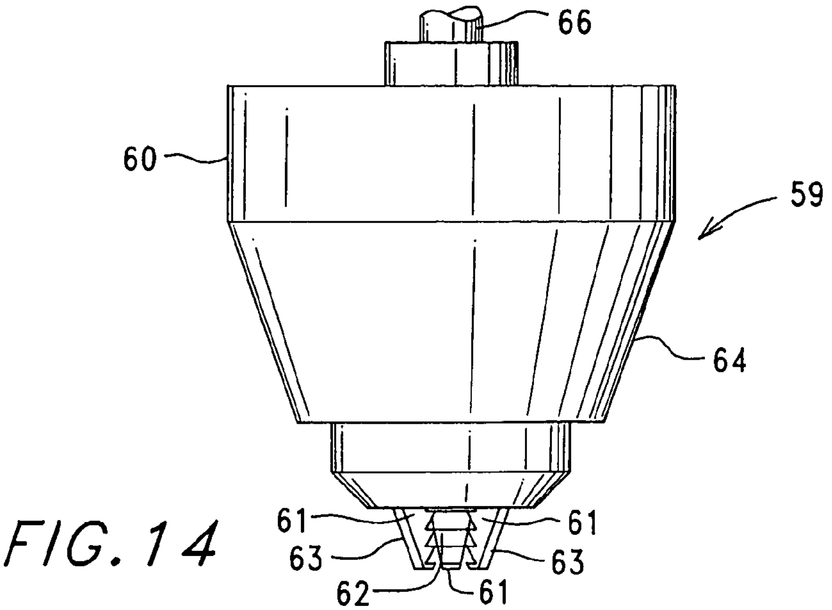
FIG. 14 is a side view of a second embodiment of the apparatus of this invention incorporated into a keyed or keyless drill chuck.
Figure 15:
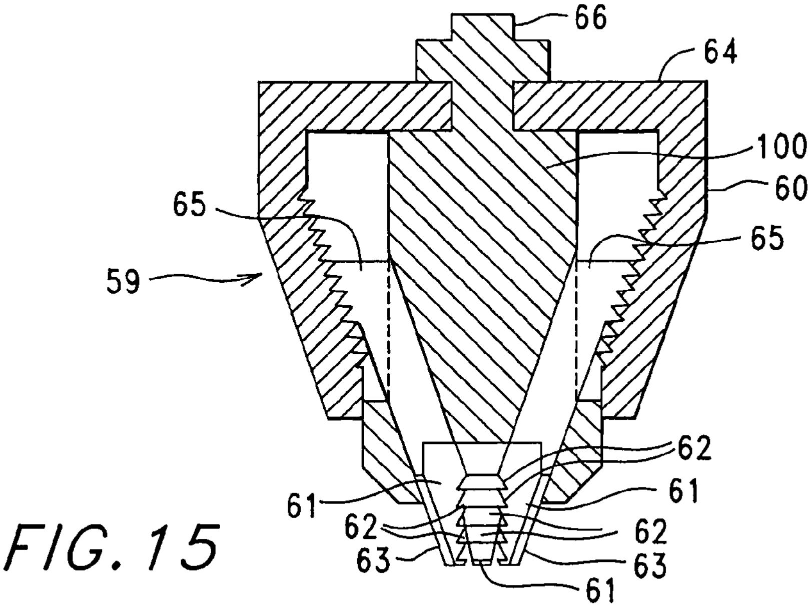
FIG. 15 is a sectional view of the apparatus of FIG. 14.
Figure 16:
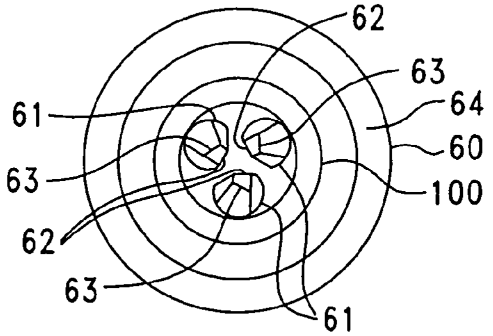
FIG. 16 is a bottom end view of the apparatus of FIG. 14.
Figure 18:
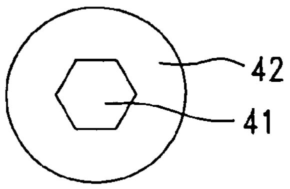
FIG. 18 is a top end view of the apparatus of FIG. 17.
Figure 19:
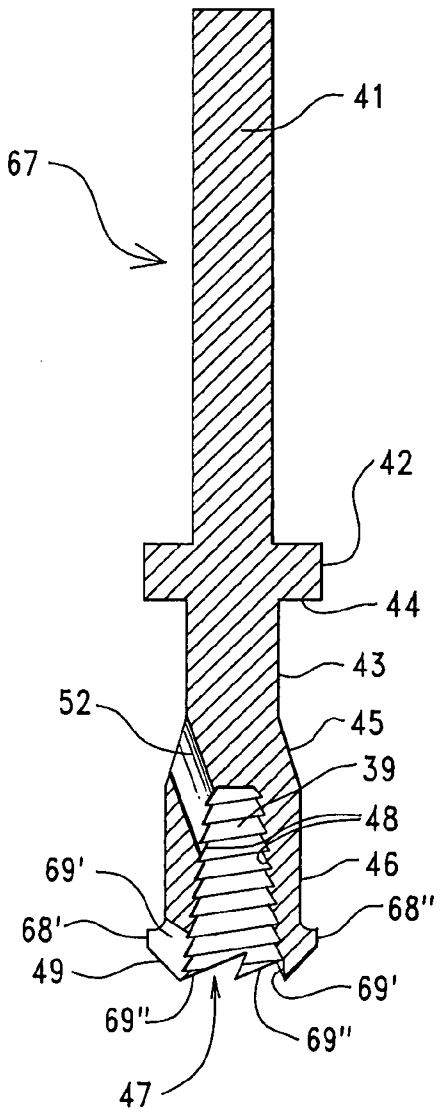
FIG. 19 is a sectional view of the apparatus of FIG. 17.
Figure 17:
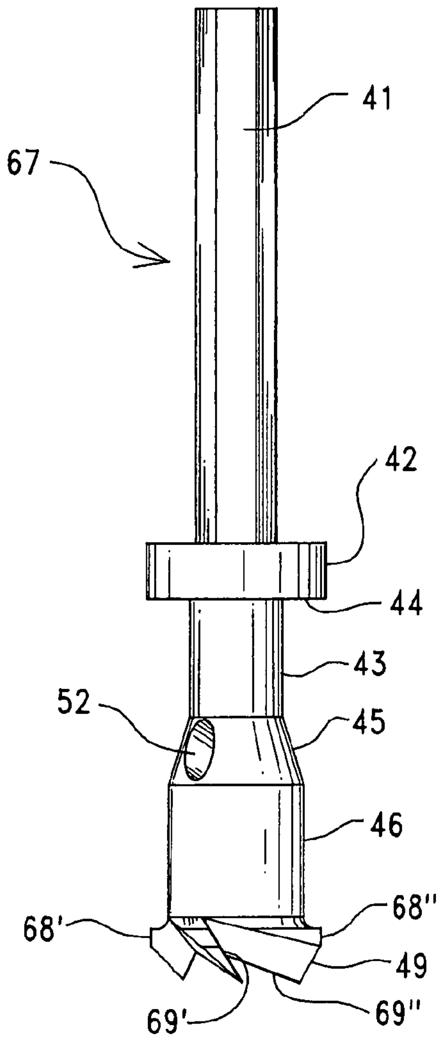
FIG. 17 is a side view of a third (and for purposes of this disclosure preferred) embodiment of the apparatus of this invention.
Figure 20:
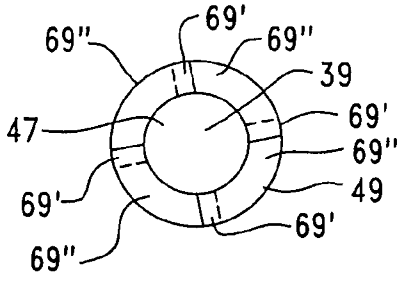
FIG. 20 is a bottom end view of the apparatus of FIG. 17.

FIGS. 14 through 16 illustrate a second embodiment 59 of the apparatus of this invention incorporated into a standard keyed or keyless drill chuck 60. Jaw elements 61 are modified to provide tooled exterior cutting edges 63 forming the cutting component for boring into a host material to gain access to the fastener, and to provide internal teeth 62 tooled at interior facing surfaces thereof forming the gripping surface formation required to efficiently grip a fastener's head or shank when the jaws are brought to bear against the sides of the fastener. As may be appreciated, jaw elements 61 together define the cavity and opening therebetween for receipt of a fastener, structures 63 and 62 defining the overall cutting component and gripping surface formation.

Chuck 60, as diagrammatically illustrated in FIG. 15, is of a type in common use where hub 100 is bored to receive and radially position three equally spaced jaw elements 61. Jaw elements 61 are restrained laterally by hub 100 but are slidably free along their longitudinal axis. The upper ends 65 of jaw elements 61 are threaded for engagement with internal threads of perimeter nut 64. Radially concentric pressure on a nail or screw is applied and released at jaw elements 61 depending on the direction of rotation of, and torque applied to, nut 64.

For purposes of illustration, in this case it is assumed that the preferred rotational direction for boring into the host material is clockwise. Rotational speed and torque are delivered at shank 66 from an externally powered drive such as a drill motor.

To remove a fastener, drill chuck 60 is positioned over the end of the fastener with jaws 61 spaced far enough apart to easily fit over the fastener. The drill is then operated, allowing cutting edges 63 of jaws 61 to remove enough wood surrounding the fastener to allow the internal thread formation defined by teeth 62 of jaws 61 to engage the fastener. At this point, the drill motor is run slowly while nut 64 is rotationally restrained, causing jaws 61 to tighten their grip at teeth 62 on the fastener until nut 64 can no longer be restrained against rotation. At that point, nut 64 is allowed to rotate with the drill chuck and the drill is operated with sufficient torque to overcome the static frictional resistance of the fastener. In the case of a normally threaded screw, counterclockwise rotation will remove the screw. In the case of a nail, rotational direction is unimportant and a pulling force is applied to chuck 60 while rotating the nail to allow nail removal.

As before, the rotation of chuck 60 serves substantially simultaneously to cut away the wood around the fastener cleanly (at cutting edges 63) while establishing the engagement with the fastener (at the engaging surface formation 62 of jaws 61), regardless of which part of the fastener, head or shank, is first encountered. When the applied torque overcomes the static torsional frictional resistance of the host material/fastener interface, the fastener will begin to rotate with the engagement. The fastener is removed from apparatus 59 by rotating the nut 64 of chuck 60 in the necessary direction to open jaws 61 allowing the fastener to fall free.

FIGS. 17 through 20 illustrate a third embodiment 67 of the apparatus very similar in both structure and operation to that illustrated in FIGS. 1 through 13, with the exception that the outside diameter of lower portion 46 of engaging member 45 is reduced compared with the maximum diameter (from 68' to 68") of the bottom edge cutting component 49 at opening 47 to cavity 39. This arrangement allows an annular space around lower portion 46 for wood shavings to clear the cutting surface at bottom edge 49 and to thus reduce heat buildup in apparatus 67 from friction.

In this embodiment, the host material cutting component 49 is configured to improve the removal of wood shavings, and the cutting surfaces 69' and 69" are planar to facilitate periodic sharpening with standard workshop tools. However, the number, arrangement, and configuration of cutting surfaces may vary to meet the needs of certain applications.

As may be appreciated, it is possible to fabricate apparatus such as those described in FIGS. 1 through 13 and 17 through 20 from a single unit of steel. As a result, use of such apparatus may require pliers or the like to assist in unthreading the fastener from such apparatus to disengage it without damaging the apparatus' internal threads.

FIGS. 21 through 34 illustrate a forth embodiment 81 of the apparatus of this invention, particularly adapted to allow a fastener to be released quickly from the apparatus after extraction from the host material. In this quick release embodiment, fastener engaging member 85, including threaded cavity 39, opening 47, gripping surface formation 48, and bottom surface cutting component 49, is provided in two halves, fixed main body 72 and moveable hinged portion 78 as shown in FIGS. 23 through 26.

Figure 21:
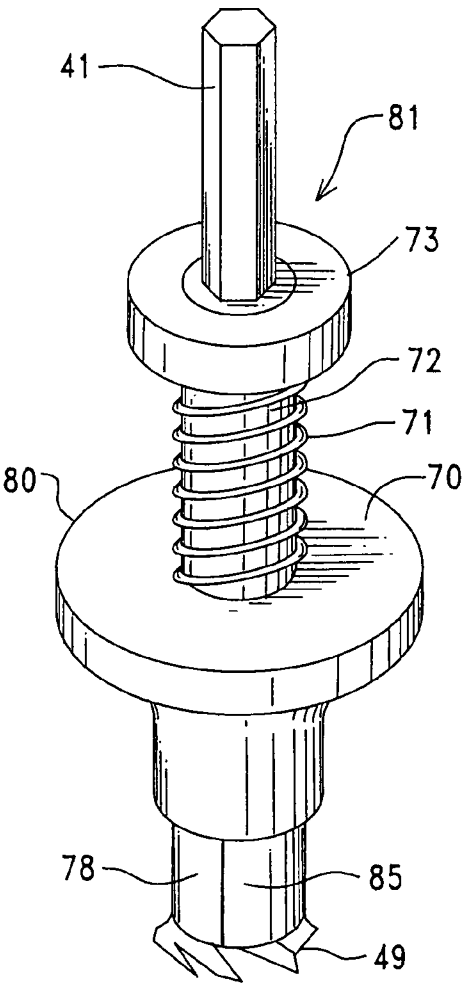
FIG. 21 is a perspective view illustration of a fourth embodiment of the apparatus of this invention adapted for quick release of a fastener shown in readiness for fastener engagement.
Figure 23:
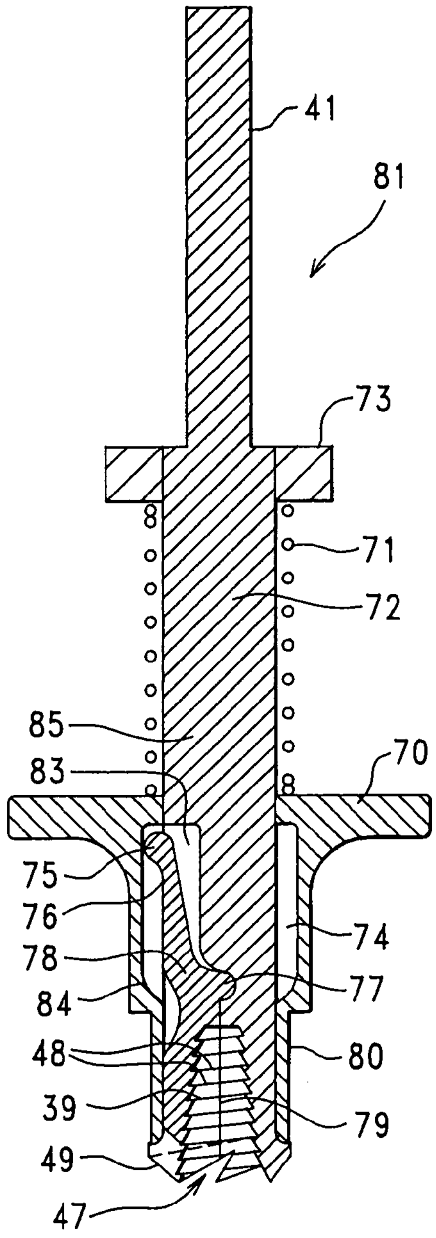
FIGS. 23 through 25 are sectional views of the apparatus of FIG. 21 illustrating operation of the quick release apparatus.
Figure 26:
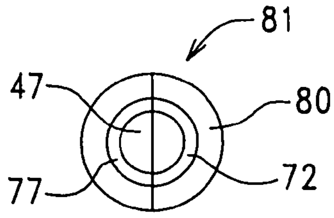
FIG. 26 is a bottom end view of the apparatus of FIG. 21.

When ready for cutting and fastener removal utilizing the steps heretofore described, hinged portion 78 is positioned with surfaces 79 of each half tight against one another thereby defining cavity/surface formation 39/48 and cutting component 49, as shown in FIG. 23. To restrain hinged portion 78 from being dislodged, by forceful engagement with a fastener for example, a slidable annular retaining sleeve 80 (FIG. 27) is positioned to encase the total assembly, as shown in FIGS. 21 and 23, and to act as a tension ring. Sleeve 80 is held by pressure from compression spring 71 against the upper surface of flanged section 70 of sleeve 80, the upper end of compression spring 71 bearing against the underside of a collar 73 fixed to the upper end of main body 72 below shank 41. For ease of assembly of apparatus 81, either the collar 73 or the flared cutting component 49 should be removable. In this embodiment, the collar 73 is assumed to be threaded, set screwed, or pinned to main body 72.

Figure 22:
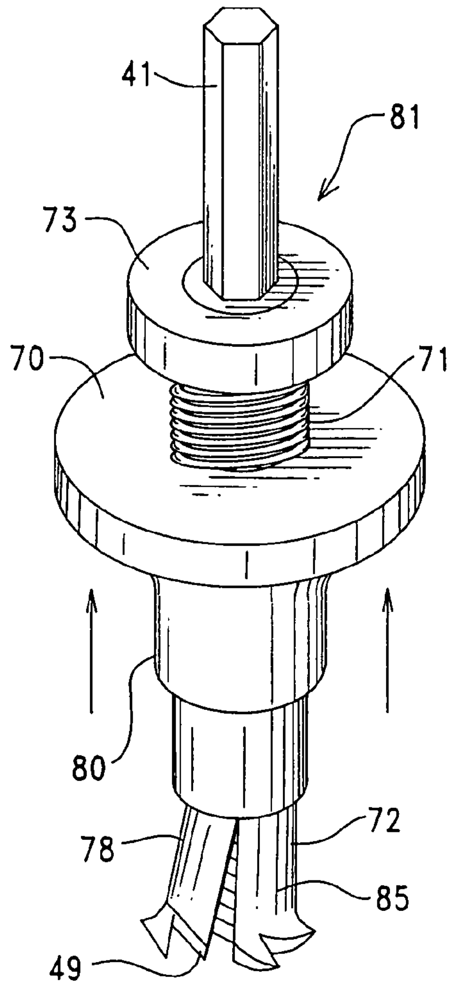
FIG. 22 is a perspective view illustration of the apparatus of FIG. 21 illustrating operation for disengagement of a fastener therefrom.
Figure 27:
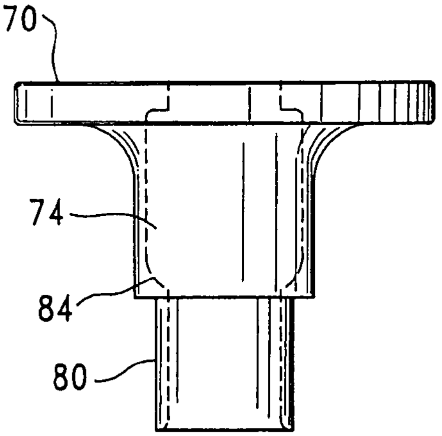
FIG. 27 is a side view of the retaining sleeve of the apparatus of FIG. 21.
Figure 24:
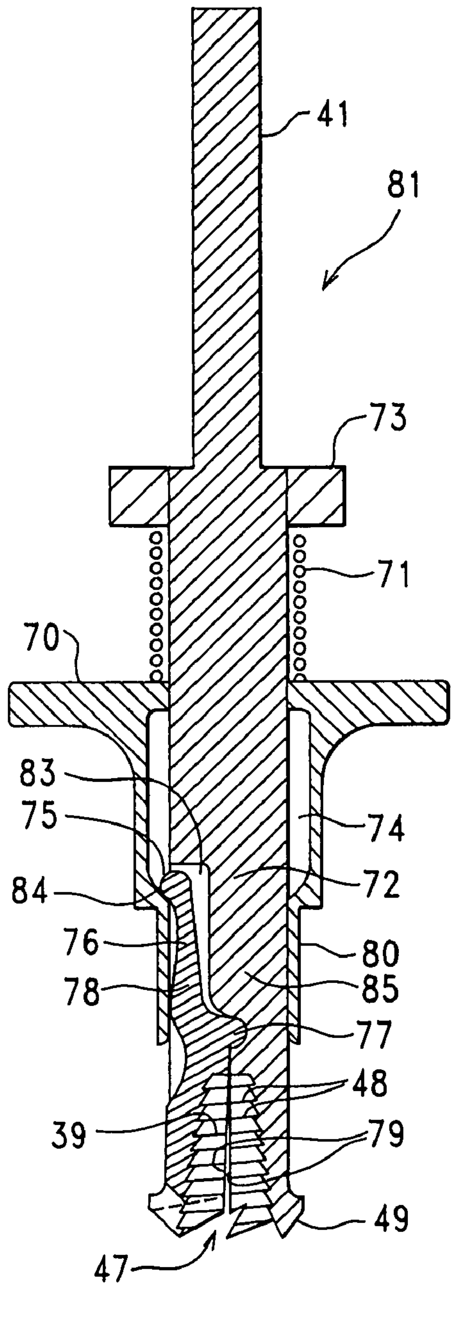
Figure 25:
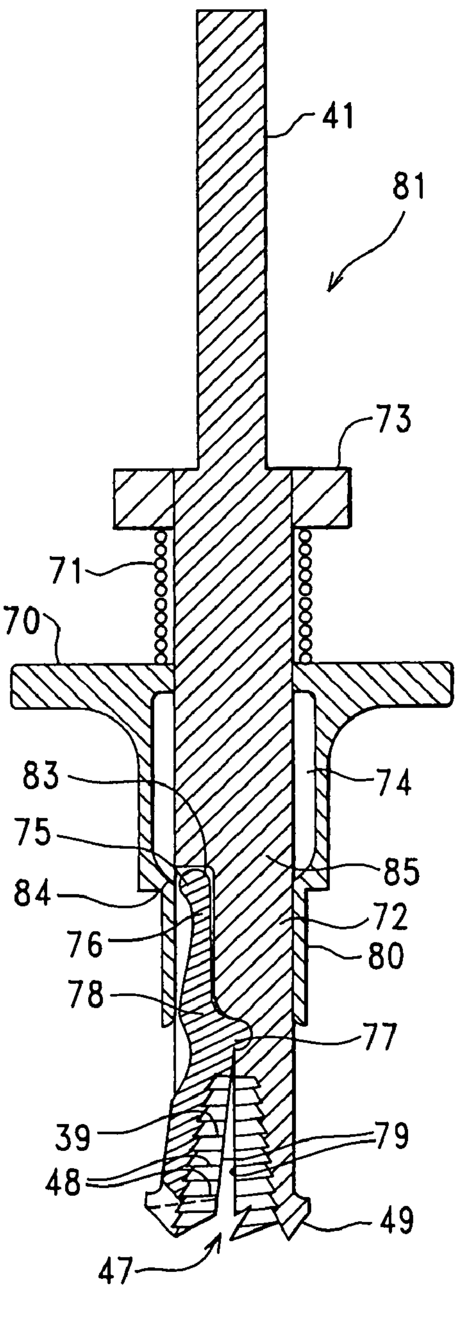
Figure 34:
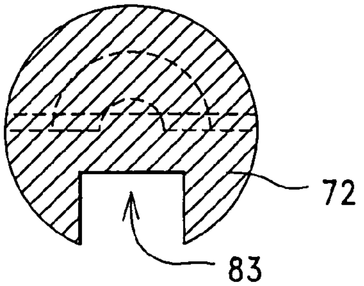
FIG. 34 is a sectional view taken through section lines 34—34 of FIG. 32.
Figure 31:
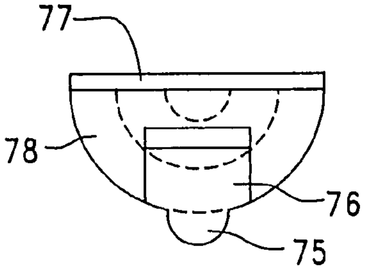
FIG. 31 is a top end view of the hinged portion shown in FIG. 28.
Figure 28:
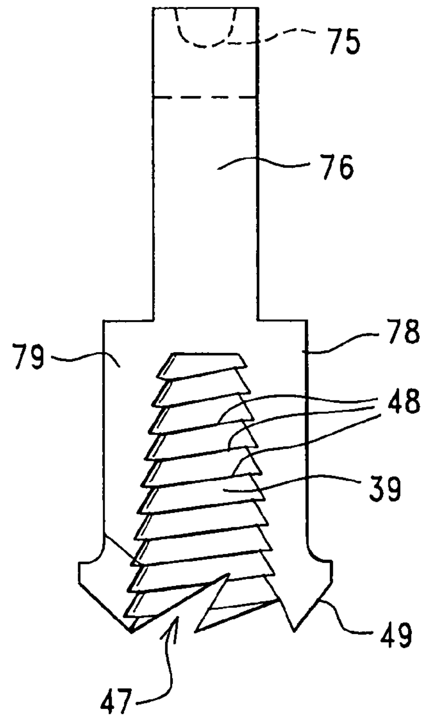
FIG. 28 is an inner side view of the hinged portion of the of the apparatus of FIG. 21.
Figure 29:
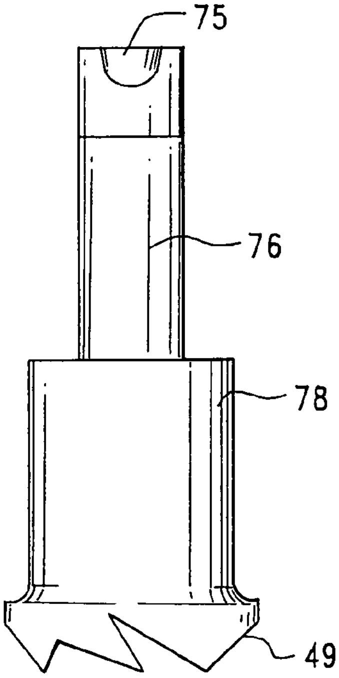
FIG. 29 is an outer side view of the hinged portion shown in FIG. 28.
Figure 30:
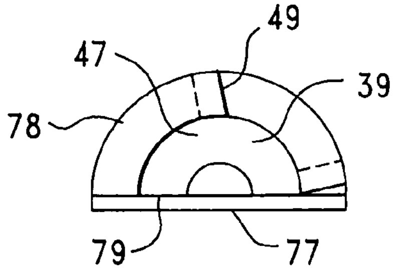
FIG. 30 is a bottom end view of the hinged portion shown in FIG. 28.
Figure 32:
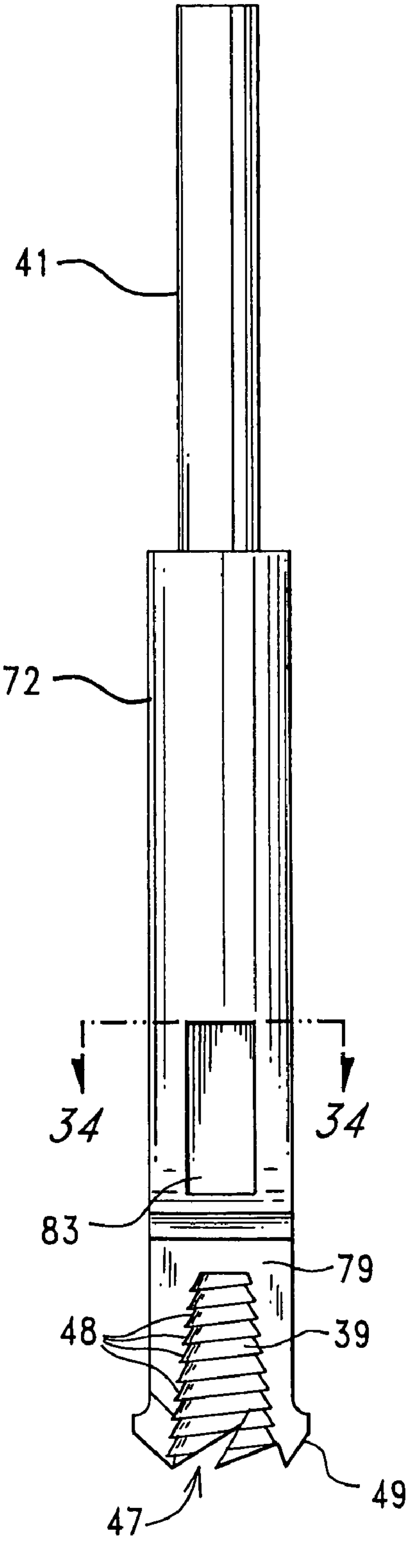
FIG. 32 is an inner side view of the main body of the apparatus of FIG. 21.
Figure 33:
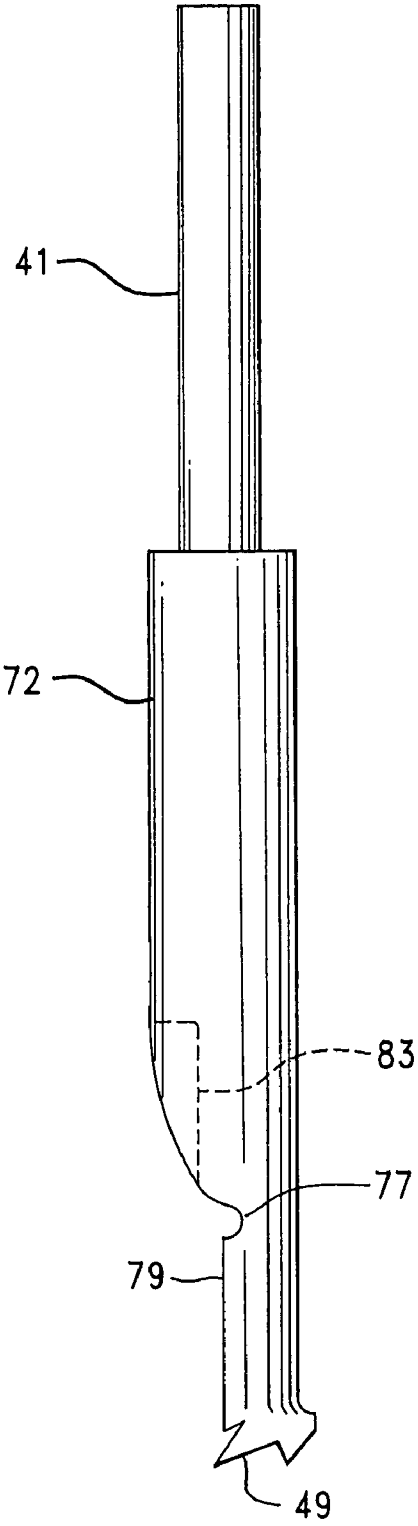
FIG. 33 is another side view of the main body shown in FIG. 32.

The effect of manually applying an upward force on the underside of flanged section 70 of sleeve 80 as necessary to compress spring 71, as shown progressively in FIGS. 24 and 25, is to lift sleeve 80 above its restraining position to a new raised position as shown in FIG. 22, creating contact along the way between internal shoulder 84 defined by annular cavity 74 at the interior of sleeve 80 and projecting tip 75 of upper lever arm 76 of hinged portion 78. Upon contact, tip 75 is deflected toward recess 83 in main body 72 of apparatus 81 as shown in FIGS. 24 and 25, causing hinged portion 78 to rotate about its hinge interface 77 thereby opening cavity 39 at surfaces 79. In this way, a fastener extracted as heretofore described, and held in cavity 39 after removal, may be quickly released by simply raising sleeve 80.

Because the fastener is bound tightly by spirally threaded formation 48 in threaded cavity 39 when surfaces 79 are held abutting by sleeve 80, simply raising the sleeve to relieve the restraint will likely be sufficient to release the fastener (the fastener itself causing movement of hinged portion 72 to some degree upon release of the applied tension). Therefore, providing the additional release assistance of movement of upper lever arm 76, caused by contact between tip 75 and shoulder 84, into annular cavity 74 may be unnecessary for most quick release fastener disposals.

As before, the rotation of engaging member 85 serves substantially simultaneously to cut away the wood around the fastener cleanly (at cutting component 49) while establishing the engagement with the fastener (at the engaging surface formation 48 of cavity 39). After initial fastener contact, the teeth defined by the spiraling thread formation 48 at cavity 39 continue to engage the fastener more forcibly with each revolution of apparatus 81 because of the increasing confinement presented by tapered cavity 39. The fastener will continually be drawn into cavity 39 by the spiraling thread formation 48 until the torque required to further engage the fastener overcomes the static torsional frictional resistance of the host material/fastener interface. The fastener will then begin to rotate with the engagement. When removed, the fastener is released by movement of sleeve 80 to allow opening of member 85 at hinged portion 78.

The various apparatus or this invention are most useful if available to the user in two or more sizes to handle the widest possible range of fastener types and conditions. The apparatus are best operated with a commonly available hand-held drill motor, although almost any driving system (including a manual system) is usable without adversely affecting intended performance. Spiraling thread formation 48 at cavity 39 could take any number of configurations, including a double (dual) or nested thread formation (the double thread starting with one at each of opposite sides of the cavity).

What is claimed is:

1. A method for rotatably extracting a nail embedded in yieldable host material, said method comprising the steps of:

establishing an annular space in said host material adjacent to an embedded nail by rotating a member to cut away host material adjacent to the nail, said annular space larger than portions of the member;

allowing at least some cut away host material to agglomerate in the annular space adjacent to the portions of the member while the host material is being cut away;

utilizing rotation to engage an end of the nail at a cavity at the member while the host material is being cut away to thereby rotate the nail; and opening the cavity to release the nail from engagement after extraction thereof from the host material.

2. The method of claim 1 further comprising pulling the member away from the host material while rotating the nail.

3. The method of claim 1 wherein the nail is at least one of substantially headless and embedded below an outer surface of the host material, the step of utilizing rotation to engage an end of the nail at a cavity at the member including establishing said engagement with either end of the nail.

4. The method of claim 1 wherein the step of utilizing rotation to engage an end of the nail includes threadably gripping the nail in the cavity.

5. The method of claim 1 further comprising the steps maintaining association of elements of said member during rotation and disassociating said elements to open the cavity.

6. A method for extracting either of a nail or screw from a yieldable host material, said method comprising the steps of:

rotating a member to cut away host material and establish a space around the nail or screw;

allowing at least some cut away host material to agglomerate in the space around the nail or screw while the host material is being cut away;

utilizing rotation of said member to establish an engagement at said member with an end of the nail or screw while the host material is being cut away;

utilizing said engagement to rotate the nail or screw to facilitate its removal from the host material; and opening said member to release the nail or screw from said engagement after extraction thereof from the host material.

7. The method of claim 6 wherein a nail is to be extracted, the method further comprising pulling said member away from said host material after establishment of said engagement and while rotating the nail.

8. The method of claim 7 wherein the nail is at least one of headless and completely embedded in the host material, the step of utilizing rotation to establish an engagement with an end of the nail including establishing said engagement with either end of the nail.

9. The method of claim 6 further comprising the steps of providing said member having first and second elements cooperatively defining an interior surface, maintaining association of said elements during rotation and establishment of an engagement, and disassociating said elements to open said member.

10. The method of claim 9 further comprising establishing a gripping formation at said interior surface, and wherein the step of utilizing rotation of said rotating member to establish an engagement at said member with an end of the nail or screw includes engaging said nail or screw at said gripping formation.

11. The method of claim 6 wherein the step of utilizing rotation to establish an engagement with an end of the nail or screw includes threadably gripping the nail or screw to establish said engagement.

12. A method for rotatably extracting a fastener from a yieldable host material, said method comprising the steps of:

locating one end of a member at a shank and providing an opening formation into a cavity extending into said member, said opening formation defining a first diameter and said one end defining a second diameter smaller than said first diameter;

defining a gripping surface in said cavity;

applying said shank to a source of rotational motion to rotate said shank and said member;

utilizing rotation of said member to cause said opening formation to cut away host material around the fastener and establish an annular space in said host material having a diameter approximating said first diameter;

allowing cut away host material to agglomerate in said annular space adjacent said one end of said member while the host material is being cut away;

utilizing rotation of said member to establish an engagement between said gripping surface and an end of the fastener to rotate the fastener; and selectively manipulating said member to open said cavity and release said fastener after extraction from the host material.

13. The method of claim 12 wherein the step of defining a gripping surface in said cavity includes formation of transverse striation at a surface of said cavity.

14. The method of claim 13 further comprising extending said cavity conically into said member, providing said member having first and second elements, and configuring each of said elements to cooperatively define said opening formation, said cavity and said transverse striation.

15. The method of claim 13 wherein said transverse striation is configured as a spiraling formation to establish gripping teeth at said surface for threadably engaging a fastener during rotation.

16. The method of claim 12 further comprising the steps of providing said member having first and second elements cooperatively defining said opening formation and said cavity and maintaining association of said elements during rotation of said member, the step of selectively manipulating said member including disassociating said elements.

17. The method of claim 16 further comprising moving a retainer into engagement with said elements to selectively restrain relative movement of said elements.

18. The method of claim 12 wherein the step of utilizing rotation of said member to establish an engagement between said gripping surface and an end of the fastener occurs while the host material is being cut away.

19. The method of claim 12 wherein the step of selectively manipulating said member to release said fastener after extraction from the host material includes relatively pivoting elements of said member to open said cavity and release the fastener from said gripping surface.

* * * * *